FIP8102 XR 2,697,205

[redacted]

SS REFERENCE EXAMINER

Dec. 14, 1954 A. A. MACDONALD 2,697,205

TELEVISION APPARATUS

Filed May 15, 1950

WITNESSES:

Robert C. Baird

Wm. C. Groome

INVENTOR

Angus A. Macdonald.

BY F. E. Browder

ATTORNEY

United States Patent Office
2,697,205
Patented Dec. 14, 1954

2,697,205

TELEVISION APPARATUS

Angus A. Macdonald, Catonsville, Md., assignor to Westinghouse Electric Corporation, East Pittsburgh, Pa., a corporation of Pennsylvania Application May 15, 1950, Serial No. 162,121

2 Claims. (Cl. 332—39)

This invention pertains to the art of electronics, and more particularly to the art of television transmission equipment.

A principal object of the invention is the provision of an improved form of monitor equipment for use in supervising the operation of a television signal transmitter, to ensure that the signal transmitted conforms to established standards and that the transmitter itself is being operated in the desired efficient manner.

More specifically, it is an object of the invention to provide a television signal monitor equipment which will provide a faithful quantitative indication of the depth of modulation of the television carrier wave by the video modulating signal, and which will also enable the operator to establish the desired relative amplitude of the synchronizing or "sync" portion of the signal to the peak radio frequency voltage of the carrier. The monitor equipment of the invention is also adapted to the indication of the peak value or magnitude of the power output at the tip of the sync pulses.

In general, television signal monitors as known to the art have comprised some form of detector or rectifier for demodulating a small portion of the R. F. output of the transmitter, and means for applying this demodulated portion to an indicator such as an ordinary cathode ray oscilloscope tube. If the demodulated signal is applied to one pair of deflecting plates (or to one deflection coil) of such a tube, and a suitable sweep or time-base voltage is applied to the orthogonal pair of plates or coil, a wave form characteristic of the composite television signal will be displayed upon the fluorescent screen of the tube. Without more, however, this wave form is a merely qualitative indication, since the observer has no way of knowing when the carrier is being modulated a known percentage of its modulated amplitude.

In order to correct this condition, and to render the indication of maximum utility, it has been proposed to provide a switch or contact device operating periodically to short-circuit the output of the demodulator. Since the detector or demodulator output is zero at 100% modulation, the tips of the pulses occurring during the shorted periods (corresponding to zero demodulator output) represent the 100% modulation level. Assuming linearity of response of the oscilloscope and any associated parts, this enables the other significant values represented by the display to be determined by simple interpolation.

The above-described proposal has several disadvantages in practice. First, in order to avoid disturbance with the presentation of the video signal itself, it is essential that the shorting device short-circuit the detector output for only a small percentage (typically 10% or less) of the total length of each cycle comprising a shorting interval and a non-shorting interval. Also, the repetition rate of the shorting device must be rather high, for example of the order of 2,000 cycles per second, in order to provide a continuous indication of the percentage of modulation.

Other disadvantages of the mechanical shorting switch are that it effectively increases the capacitance of the detector circuit, and thus distorts the wave-form presentation, and it is of limited life and subject to failures due to the difficulty of designing a mechanical switch for the duty described above.

It is accordingly a further object of the invention to provide a modulation indicator or monitor which does not depend upon a set of high-speed contacts for establishing the numerical magnitudes of the significant features of the wave-form presentation, which will be very simple in construction, adjustment and operation, will have a long and relatively trouble-free life, and which will not involve deleterious distortion of the wave-form displayed by the monitor.

The above and other objects and advantages of the invention are obtained by the provision of electronic circuit means for performing the function of periodically interrupting the output of the monitor detector or demodulator. A preferred form of the invention is described in detail in the specification which follows, and is illustrated in the accompanying drawing, but it is to be understood that the details of the disclosed embodiment may be varied considerably without departing from the scope of the claims appended to the specification.

Figure 1:
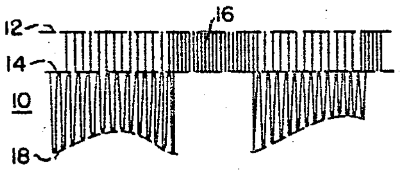
Fig. 1 is a representation of the signal trace displayed upon a television monitor oscilloscope tube having no provision for establishing the percentage modulation level.

Referring now to Fig. 1 of the drawing, the graph 10 represents a typical display trace obtained upon the screen of a television transmission monitor. The dash line numbered 12 in this figure denotes maximum carrier amplitude obtained at the peak of the sync pulses, i. e. modulation percentage occurring during the period or interval being displayed, the dash line 14 denotes the depth of modulation of the synchronizing pulses 16 or maximum carrier amplitude during blanking pulses, and the dash line 18 denotes the carrier amplitude corresponding to maximum instantaneous modulation percentage during the interval under consideration. This interval is determined by the sweep frequency or frequency of the timing voltage deflecting the cathode ray beam in the horizontal direction, and for convenience this sweep frequency may be made equal to the frame frequency of the television signal, which would be 30 cycles per second under present United States television transmission standards.

While the dash lines 12, 14 and 18 of Fig. 1 indicate the values mentioned above in a qualitative fashion, it is clear that the observer has no knowledge as to their quantitative values, since he has no way of determining the modulation level represented by any of these dash lines. If, however, the output of the monitor be periodically interrupted, the display trace during such periods will occupy a level corresponding to 100% modulation of the carrier, as shown by dash line 20 in Fig. 2. In the intervals between the periods of interruption, the signal trace 22 indicates the instantaneous value of video modulation, and the scale is determined by dash line 23 corresponding to maximum carrier amplitude, or zero percentage modulation. Similarly, dash line 24, denoting the amplitude level of the carrier during the transmission of blanking pulses, may readily be observed in quantitative relation to the zero and 100% modulation levels. Dash line 23, i. e. 0% modulation, denotes the carrier level during transmission of the sync pulses.

With the above information at hand, it is a simple matter for the transmitter operator to adjust the transmitter to provide an output in which the sync pulse amplitude is set at 25% of peak carrier voltage, and to ensure that the maximum video signal level or modulation does not exceed 87.5% to conform to present United States television practice.

Figure 3:
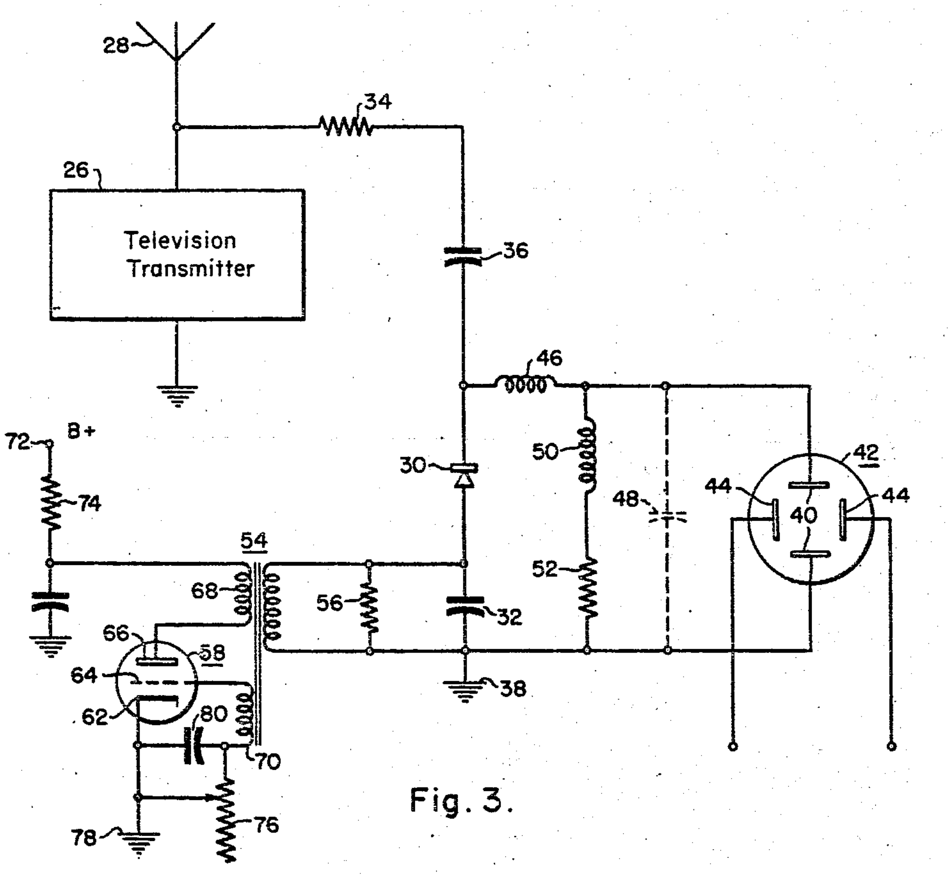
Fig. 3 is a schematic diagram showing the application of the invention to the usual demodulator type of monitor equipment.

In order to accomplish the desired interruption of the detector output which is applied to the indicator tube, and to do this without the use of mechanically moving parts or contacts, the invention contemplates the employment of an electronic circuit which is shown in Fig. 3 of the drawing in connection with a diagrammatic illustration of a television transmitter 26. The details of construction of this transmitter are not illustrated in the drawing, since it may be of any well known or desired form so long as it is adapted to produce the usual television signals for radiation from an antenna such as is designated by numeral 28.

A portion of the television or video signal output of transmitter 26 is applied across a suitable rectifier element 30, which may desirably be of the crystal rectifier type, and a by-pass capacitor 32. Fig. 3 illustrates the video signal portion as derived from the transmitter output through a dropping resistor 34 and a coupling capacitor 36, resistor 34 being chosen of such value as to reduce the voltage fraction applied across detector rectifier element 30 to a suitable value. However, it should be understood that the desired portion of the video signal may be obtained by a usual form of voltage divider or equivalent voltage dropping means, and it should also be understood that this signal may also be obtained from some intermediate portion of the transmitter so long as the signal contains the required modulation components. The video signal may also be obtained from a separate antenna and an amplifier or a television receiver may be included between said separate antenna and the detector element 30.

The lower plate of capacitor 32 is grounded as at 38, and it follows that the current flowing through element 30 and this capacity, and the voltage across these elements, will constitute a demodulated portion of the signal obtained from transmitter 26. This demodulated signal portion is applied to the vertical deflecting means, represented by electrodes 40 of the cathode ray oscilloscope tube 42, illustrated schematically since its detailed structure is well known in this art. Suitable power supply circuits are of course provided for the electrodes of tube 42, these again being omitted from the drawing for clarity and in view of the fact that they are well known in the art. In order to produce a suitable horizontal or timing sweep for the tube 42, a suitable sweep voltage such as a sawtooth voltage is applied to the horizontal deflecting means such as plates 44 of the tube 42, and this timing voltage may have such a frequency as to produce a relatively stationary pattern upon the screen of tube 42. A timing wave frequency of 30 cycles per second is suitable for use in connection with television signals conforming to present United States practice, and this voltage may conveniently be obtained from the frame-frequency voltage supply of the associated transmitter 26.

A video peaking choke or inductance 46 is provided in the load circuit to filter out radio-frequency or carrier frequency components and prevent their application to the indicator tube 42, this choke cooperating with the circuit capacity (designated by dashed line capacitor 48) to form a low pass filter across the detector 30 and capacitor 32. A load circuit represented by an inductance 50 and a load resistor 52 is connected across the demodulator circuit branch including detector 30 and capacitor 32.

Considering the load circuit for the detector as comprising elements 50 and 52 as described above, it is seen that the demodulator element 30 is effectively in shunt to the load circuit rather than having the more usual series relationship thereto, which makes it possible to bias the detector element 30 to cut-off by a voltage pulse applied in series with such detector element without appreciably affecting the load or output circuit of the demodulator. To accomplish this, a transformer 54 having a secondary winding whose resistance is preferably low in comparison with the forward resistance of detector element 30 has its secondary winding connected across the capacitor 32, and such winding is shunted by a damping resistor 56 of such a value as to damp out oscillations which might otherwise be produced in the resonant circuit comprising the transformer secondary winding and the by-pass capacitor, when excited by a voltage pulse in the secondary winding.

In order to furnish the gating pulse in transformer 54 for biasing detector element 30 to cut-off at the desired repetition rate, there is illustrated in Fig. 3 a blocking oscillator circuit comprising a space discharge tube 58 which is shown as a triode vacuum tube having a cathode 62, control grid 64 and anode or plate electrode 66. The transformer 54 is illustrated as including two primary windings 68 and 70, there being sufficient mutual inductance between these two windings to provide the necessary plate-to-grid energy feedback to support oscillations of the space current of tube 58, which is provided with any usual form of cathode heating means and power supply (not shown) as well known in this art.

A direct current anode voltage supply indicated at 72 is connected in series with a plate supply resistor 74 and transformer winding 68 to anode or plate 66, and the grid or control electrode 64 is connected to transformer winding 70 and thence to the cathode 62 through biasing resistor 76, one end of this resistor and the cathode 62 being grounded as at 78. A capacitor 80 is in series with the grid-cathode circuit and is shunted by a resistor 76. While the operation of a blocking oscillator circuit is well understood by those skilled in this art, the operation may be described briefly as resulting from the periodic accumulation and dissipation of a negative charge on the grid capacitor 80. Assuming that this capacitor has been charged during a previous cycle so that the condenser plate nearest the grid connection is negative, the tube will be biased below cut-off. As the charge on the condenser 80 leaks off through resistor 76, the biasing voltage is reduced to a point where the tube commences to conduct current along its anode-cathode path. The resulting plate current flows through winding 68 which is poled to induce in winding 70 a potential which drives the grid 64 more and more positive. Ultimately the grid becomes positive with respect to cathode 62, and begins to draw current, and electrons accumulate on that plate of capacitor 80 which is nearest the grid. When the space current through the tube reaches the saturation level, no voltage is induced in winding 70, and in the absence of a charging potential capacitor 80 commences to discharge, causing the grid potential to become less positive and reducing the plate current. This results in the induction of a reverse voltage in winding 70, driving the grid more negative and ultimately beyond cut-off to complete the cycle. The frequency of the gating pulses induced in the secondary winding of transformer 54 may be adjusted by varying the value of resistor 76 or the portion of it included across capacitor 80. Normally, the frequency will be adjusted to a value of the order of 2,000 cycles per second and the adjustment will thereafter normally remain fixed.

Figure 2:
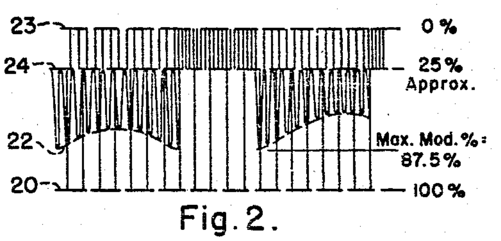
Fig. 2 is a similar representation of the display trace obtained with the present invention.

In view of the above description, it is clear that the operation of the blocking oscillator will produce periodic voltage pulses in the secondary winding of transformer 54, and the magnitude of these voltage pulses is adjusted so that they periodically bias detector element 30 to cut-off at a frequency determined by the frequency of the oscillator circuit including tube 58; when the detector is so biased, it provides no output voltage to the load circuit, so that the wave form presented on the screen of tube 42 has superposed thereon the reference pulses corresponding to 100% modulation of the carrier wave produced by transmitter 26. The pattern corresponding to Fig. 2 is therefore obtained, giving the quantitative indication of percent modulation and other factors noted earlier in this specification.

The above description is biased upon the use of a crystal rectifier or detector element 30, which has been found very satisfactory in use. While a high vacuum diode tube could be used for the same purpose, it has the disadvantage that it produces a small potential across the load resistance 52 even when no radio frequency power is applied to the demodulator, which somewhat reduces the accuracy of the cathode ray tube indications. Also, it should be understood that though the use of a blocking oscillator as the source of gating or reference pulses is illustrated, any equivalent source of such pulses could be substituted for such oscillator if desired. These and other changes of like nature may be made in the system disclosed without departing from the spirit of the invention, whose scope is defined in the appended claims.

I claim as my invention:

1. A monitoring apparatus for television transmitters, comprising means for deriving from a transmitter a voltage corresponding to the signal output thereof, a detector element, means for applying said voltage across said detector element, a load circuit connected in shunt relation to said detector element to develop a demodulated voltage in said load circuit, a cathode ray tube indicator, means for applying at least a portion of said demodulated voltage to said tube to control the pattern displayed thereby, and voltage-pulse generating means connected in series with said detector element for periodically biasing the latter to cut-off to provide a reference level in the pattern displayed by said tube, said pulse generating means having an impedance relatively low as compared with the forward resistance of said detector element.

2. An electronic modulation indicator comprising a demodulator element, a load circuit in shunt relation to said element, means providing a visual display corresponding to the demodulated voltage developed in said load circuit, an oscillator, means providing a low-impedance output circuit for said oscillator, and means connecting the output circuit of said oscillator in series with said detector element for intermittently biasing the same to cut-off.

References Cited in the file of this patent

UNITED STATES PATENTS

| Number | Name | Date |
|---|---|---|
| 2,329,625 | Kentner | Sept. 14, 1943 |
| 2,496,259 | Bachman | Feb. 7, 1950 |
| 2,521,482 | Ruston | Sept. 5, 1950 |